United States Patent [19]
Hwang

[11] Patent Number: 6,079,657
[45] Date of Patent: Jun. 27, 2000

[54] STRUCTURE TELECOMMUNICATIONS CABLE REEL

[76] Inventor: Lih-Jiuan Hwang, 18F-2, No. 2, Lane 175, Sec. 3, Shiou-Lang Rd., Chung-Ho City, Taipei Hsien, Taiwan

[21] Appl. No.: 09/247,592

[22] Filed: Feb. 10, 1999

[51] Int. Cl.[7] .......................... B65H 75/38; B65H 75/30; H04M 1/76; H02G 11/02
[52] U.S. Cl. ...................... 242/388.1; 242/395; 379/438; 191/12.4
[58] Field of Search ................................. 242/388.1, 395, 242/378.1, 380, 402; 379/438; 191/12.4

[56] References Cited

U.S. PATENT DOCUMENTS

| | | | |
|---|---|---|---|
| 2,429,675 | 10/1947 | Eypper | 242/388.1 |
| 4,150,798 | 4/1979 | Aragon | 242/388.1 |

*Primary Examiner*—John Q. Nguyen

[57] ABSTRACT

A telecommunications cable reel that is comprised of a top cover, a bottom cover, a winding plate, and a telecommunications cable of which, the bottom cover and the top cover are the congruent halves that form the enclosure. The top cover has a winding plate opening at the center that is utilized for the placement of a winding plate. At the two sides of the bottom cover and in alignment with the terminal holders of the top cover are the terminal holders that provide for the placement of the terminals at the two ends of the telecommunications cable and at the center of bottom cover is a spindle that is utilized to mount the winding plate. The reel is utilized to bind and roll up the telecommunications cable is situated at the center of the winding plate. The telecommunications cable reel herein is physically compact, conveniently portable, can be utilized and rewound simply and quite rapidly, making the cable reel herein very suitable for utilization with both notebook computers and desktop computers.

2 Claims, 6 Drawing Sheets

STRUCTURE TELECOMMUNICATIONS CABLE REEL

BACKGROUND OF THE INVENTION a. Field of the Invention

The invention herein relates to a kind of improved structure telecommunications cable reel, specifically referring to a kind of reel structure for the winding of telephone cables. Physically compact and convenient to operate, the invention herein is capable of storing telecommunications cables neatly, while also being portable and durable in design.

b. Description of the Prior Art

Connective cables of various types are required between computer peripheral hardware equipment and computers. To increase performance, a computer may be equipped with an great amount of hardware and consequently requiring a confusing number of computer peripheral cables.

At present, most people install cables that are secured in position by ties. However, the cables must be disconnected whenever hardware is moved or serviced and then later reinstalled and secured. Otherwise, the cables will become disorderly and unattractive.

Furthermore, with the rapid development of computer communications today, even notebook computers are equipped with internal modems to facilitate interfacing to E-Net and ISDN or to RJ11 lines for facsimile operation and so on. If a notebook computer is not equipped with a telecommunications cable (as shown in FIG. 1) for internal modem or telephone utilization, the user must carry a separate telecommunications cable to enable connectivity as necessary. However, when a telecommunications cable that is one-meter in length is to be placed aside, the cable must first be wound up and bound with a tie to form a manageable coil. When the user needs to utilize the cable again, the coiled cable must be unwound to traverse the distance between the notebook computer or desktop computer and the telecommunications line. Such coiled telecommunications cables have an appearance that is displeasing and in addition to lacking attractiveness, are easily lost or damaged and, therefore, quite inconvenient to utilize.

To solve the aforementioned problems, a manufacturer designed a kind of telecommunications cable reel (10) [Taiwan Patent Application No. 83,212,880]. The aforesaid telecommunications cable reel (10) had two jacks (11) on the front and a telecommunications cable (12) of considerable length wound at the center. During utilization, the original telecommunications line was plugged into the one of the jacks (11), with the two ends of the telecommunications cable (12) and the original telecommunications line pulled to the modem and the telephone line jack.

Furthermore, the aforementioned kind of cable reel was physically large, heavy, and difficult to carry. Bearing such a cable reel was tiring, especially when toting a smaller notebook at the same time. In addition, while the major application was to extend the reach of the telecommunications line, utilization required the presence of the original telecommunications line, an inefficient approach to cable management in which the original telecommunications line was still subject to the existent problems previously described.

SUMMARY OF THE INVENTION

In view of the aforementioned situation, extensive research was conducted to design an improved structure telecommunications cable reel capable of surmounting the aforementioned difficulties.

Therefore, the primary objective of the invention herein is to provide a kind of improved structure telecommunications cable reel that is comprised of a top cover, a bottom cover, a winding plate, and a telecommunications cable of which, the bottom cover and the top cover are the congruent halves that form the enclosure. The top cover has a winding plate opening at the center that is utilized for the placement of a winding plate. At the two sides of the bottom cover and in alignment with the terminal holders of the top cover are the terminal holders that provide for the placement of the terminals at the two ends of the telecommunications cable and at the center of bottom cover is a spindle that is utilized to mount the winding plate. The reel is utilized to bind and roll up the telecommunications cable is situated at the center of the winding plate. The improved structure telecommunications cable reel of the invention herein is physically compact, conveniently portable, can be utilized and rewound simply and quite rapidly, making the invention herein very suitable for utilization with both notebook computers and desktop computers.

To enable a further understanding of the disclosure and objectives of the invention herein in terms of the structure and technological content, the brief description of the drawings below is accompanied by the detailed description of the invention herein.

DETAILED DESCRIPTION OF THE PREFERRED EMBODIMENTS

Figure 1:
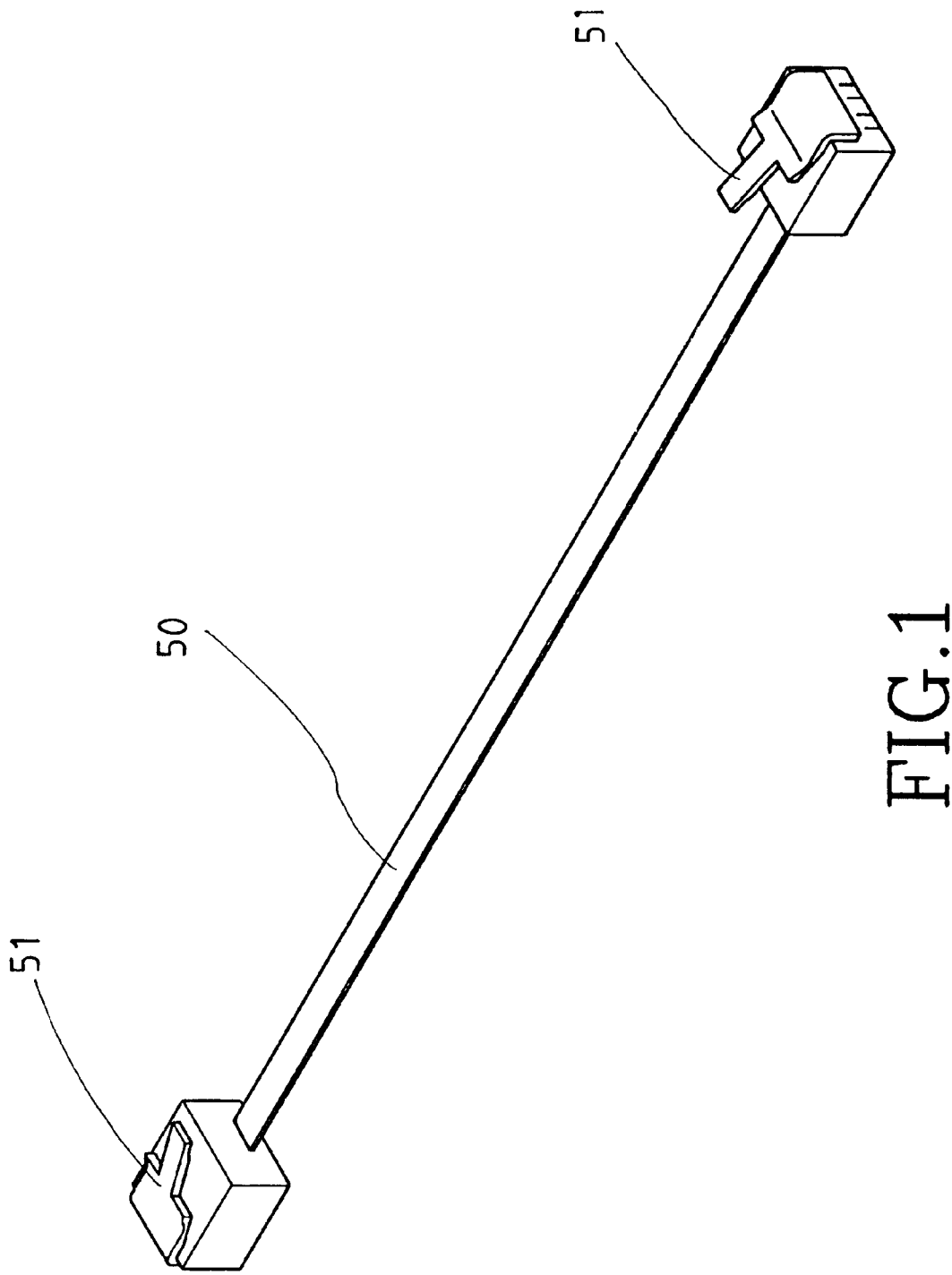
FIG. 1 is an isometric drawing of a telecommunications cable with modular terminals.
Figure 2:
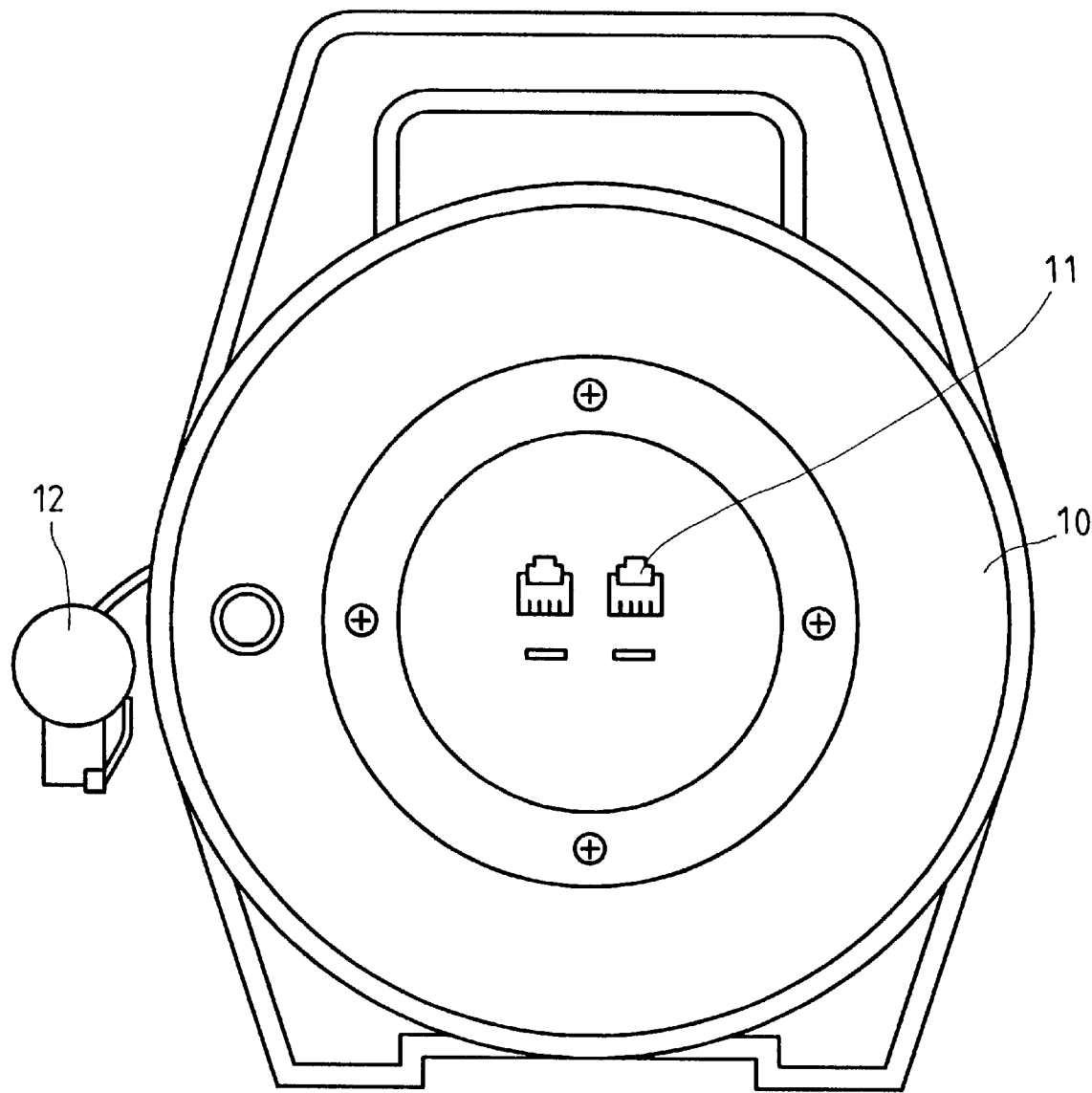
FIG. 2 is an orthographic drawing of a conventional telecommunications cable reel.
Figure 3:
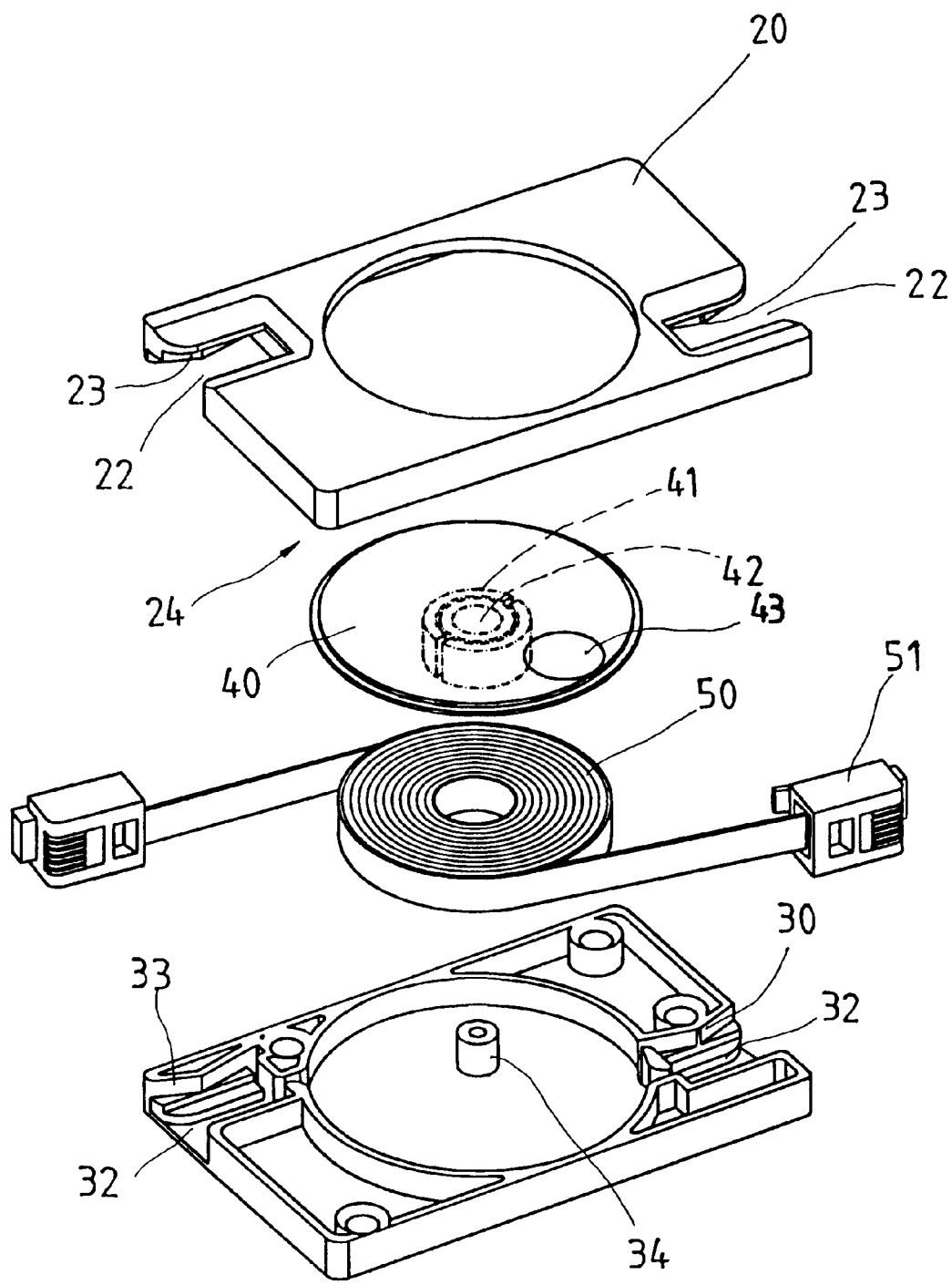
FIG. 3 is an exploded drawing of the invention herein.

Referring to FIG. 3, the improved structure telecommunications cable reel of the invention herein is comprised of a top cover (20), bottom cover (30), winding plate (40), and a telecommunications cable (50).

Of which, the aforesaid top cover (20) has a winding plate opening (21) at the center that is utilized for the placement of the winding plate (40), at the front and rear of the top cover (20) there are the terminal holders (22) and (22) with laterally positioned indentations (23), and there are a number of posts (24) on the interior surface of the top cover (20).

The bottom cover (30) and the top cover (20) are the congruent halves that form the enclosure of the invention herein, there are a number of receptacles (31) on the interior surface of the bottom cover (30) that facilitates the assembly of the top cover (20) and the bottom cover (20) into a single physical entity after insertion of the aforesaid posts (24), and at the two sides of the bottom cover (30) and in alignment with the terminal holders (22) of the top cover (20) are the terminal holders (32), each of which have the laterally positioned indentations (33), that provide for the placement of the terminals (51) at the two ends of the telecommunications cable (50), with the indentations (33) serving as the means of securing the terminal (51) in position; and at the center of bottom cover (30) is a spindle (34) that is utilized to mount the winding plate (40).

Situated at the center of the winding plate (40), the reel (41) is utilized to bind and roll up the telecommunications cable (50) and, after the hole (42) in the center of the reel (41) is placed onto the aforementioned spindle (34), the spindle (34) serves as the center of rotation of the reel (41), with the recess (43) on the surface of the winding plate (40) providing for the rotation of the winding plate (40) by means of a finger.

Figure 4:
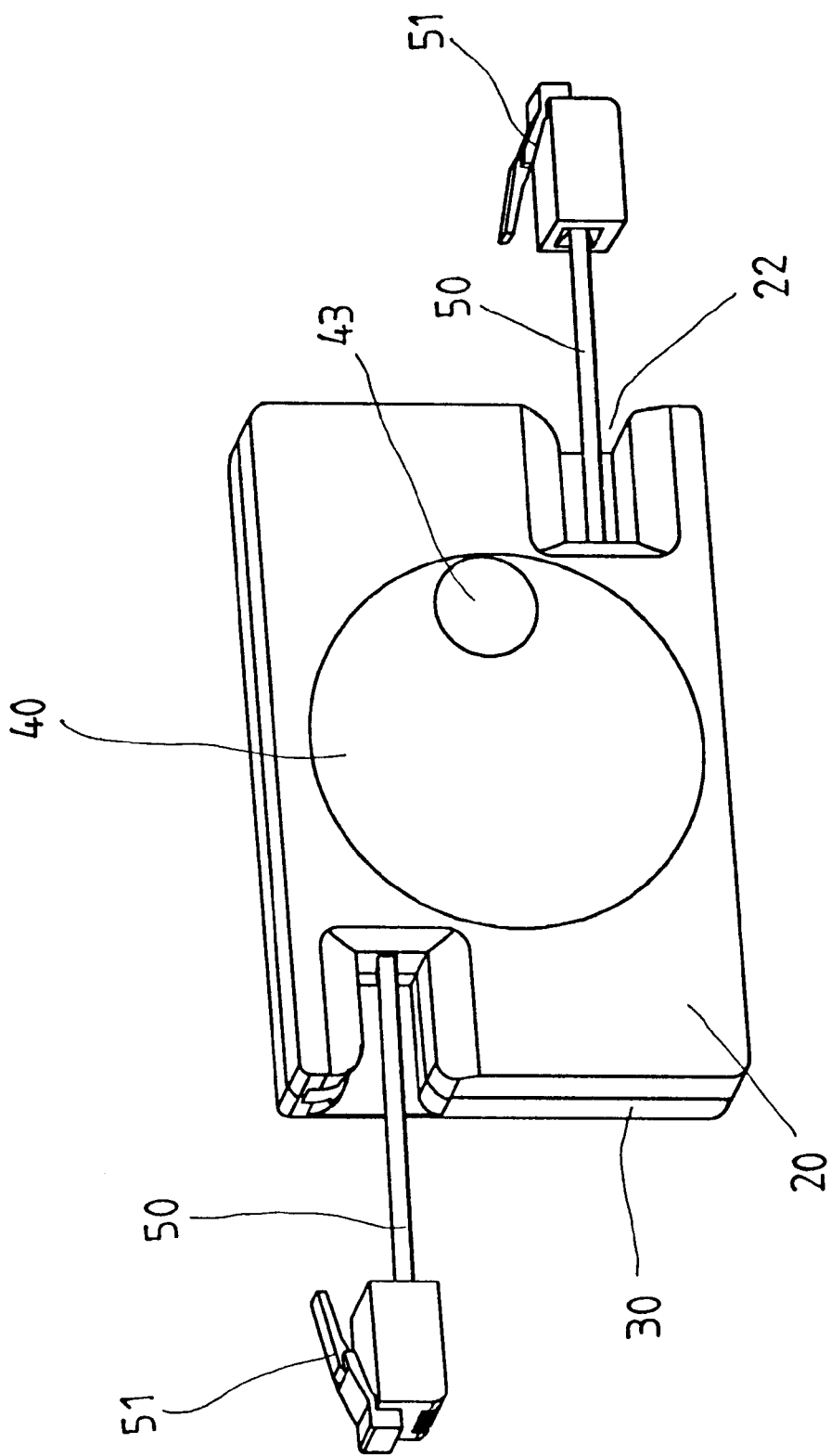
FIG. 4 is an isometric drawing of the invention herein.

When the invention herein is assembled, the telecommunications cable (50) is wound around the reel (41) of the winding plate (40) and then the winding plate (40) is installed onto the spindle (34) on the bottom cover (30), following which the two terminals (51) of the telecommunications cable (50) are inserted into the terminal holders (32) and finally, the top cover (20) is assembled to the bottom cover (30), with the easily completed structure of the invention herein appearing as illustrated in FIG. 4.

Figure 5:
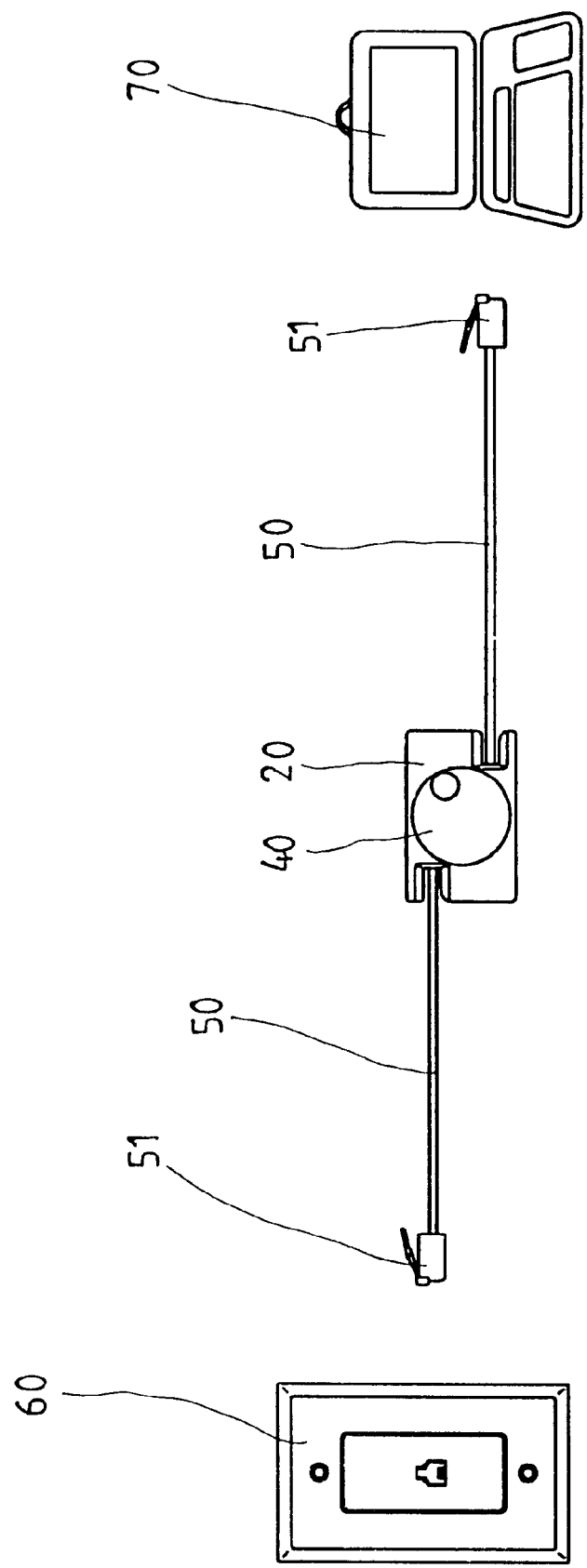
FIG. 5 and FIG. 6 are embodiments of the invention herein in example applications.
Figure 6:
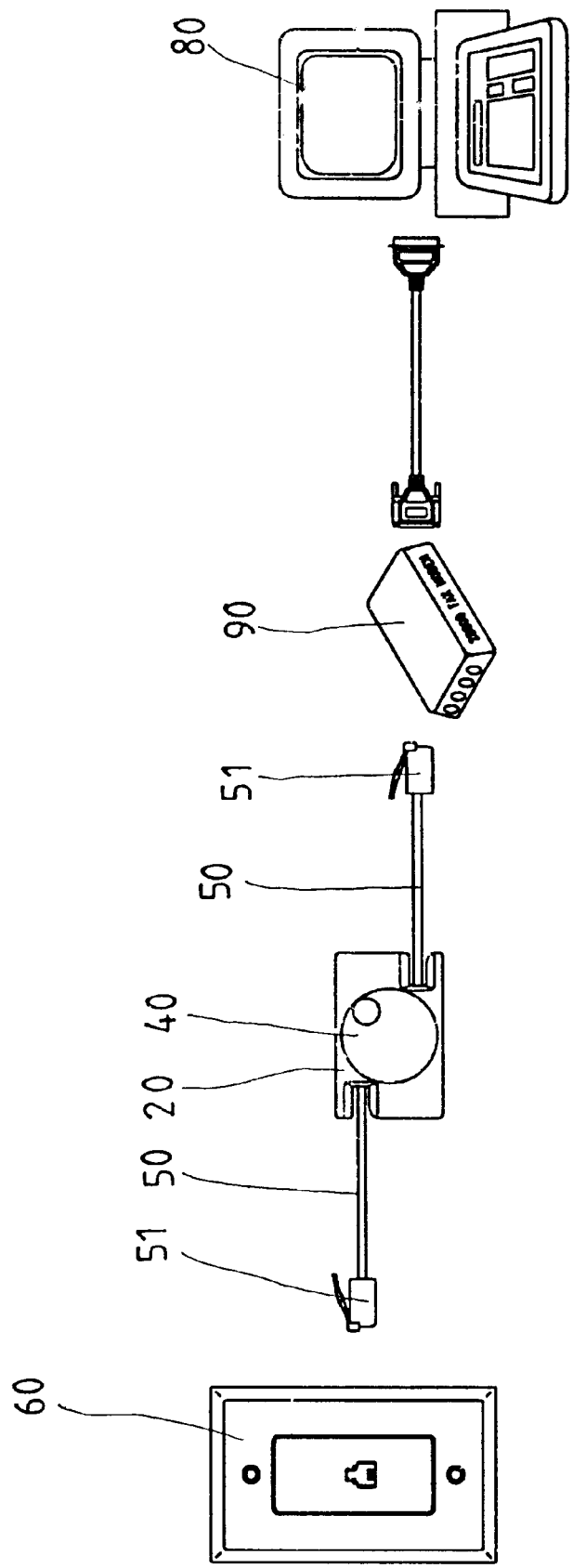

Referring to FIG. 5 and FIG. 6, when the embodiments of the invention herein are utilized in the example application depicted, after the telecommunications cable (50) is extended by pulling the terminals (51) at the two ends, the terminals (51) are respectively plugged into the telecommunications jack (60) and the modem jack of a notebook computer (70) or respectively plugged into the telecommunications jack (60) and the modem (90) of a desktop computer (80); retracting the invention herein only requires the removal of the terminals (51) from the telecommunication jack (60), notebook computer (70) or the modem (90), followed by rotating the winding plate (40) by finger to retrieve the telecommunications cable (50) until the terminals (51) engage the indentations (23) and (33) of the terminal holders (22) and (32), respectively, at which time the telecommunications cable (50) is fully rewound.

In summation of the foregoing description, since the improved structure telecommunications cable reel of the invention herein is physically compact, conveniently portable, can be utilized and rewound simply and quite rapidly, as well as both practical and progressive, the invention here is lawfully submitted in application for the commensurate patent rights.

However, the preferred embodiments of the improved structure telecommunications reel of the invention herein shall not be interpreted as a limitation of the invention herein based on a particular application and, furthermore, modifications and adaptations to the invention herein shall still be regarded as within the scope of the following claims of the invention herein.

What is claimed is:

1. A telecommunications cable reel that is comprised of a telecommunications cable having a terminal at each of the two ends; a top cover having a winding plate opening at the center, two terminal holders at the front and rear of the aforesaid top cover, and number of posts on the interior surface of the aforesaid top cover; a bottom cover that is congruent in shape with the aforesaid top cover, both of which form the enclosure of the reel herein; furthermore, there are a number of receptacles on the interior surface of the aforesaid bottom cover that facilitates the assembly of the aforesaid top cover and the aforesaid bottom cover into a single physical entity after insertion of the aforesaid posts into said receptacles; and at the two sides of the aforesaid bottom cover and in alignment with the aforesaid two terminal holders of the aforesaid top cover are another pair of terminal holders that provide for the placement of the aforesaid terminals at the two ends of the aforesaid telecommunications cable; a winding plate and the aforesaid winding plate is rotatably positioned in the aforesaid winding plate opening of the aforesaid top cover, and situated at the center of the aforesaid winding plate is a reel that is utilized to bind and roll up the aforesaid telecommunications cable and, after a hole in the center of the aforesaid reel is placed onto a spindle at the center of the aforementioned bottom cover, the aforesaid spindle serves as the center of rotation of the aforesaid reel, with a recess provided on the surface of the aforesaid winding plate for enabling the rotation of the aforesaid winding plate by means of a finger; the aforementioned telecommunications cable is wound around the aforesaid reel of the aforesaid winding plate and then the aforesaid winding plate is installed onto the aforesaid spindle on the aforesaid bottom cover, following which the aforesaid two terminals of the telecommunications cable are inserted into the aforesaid two terminal holders and finally, the aforesaid top cover is assembled to the aforesaid bottom cover, which forms the telecommunications cable reel.

2. A cable reel as mentioned in claim 1 wherein there are indentations that are laterally positioned in the aforementioned two terminal holders of the aforementioned top cover as well as in the aforementioned two terminal holders of the bottom cover, with the aforesaid indentations serving as the means of securing the aforementioned two terminals of the aforementioned telecommunications cable in position after insertion of the terminals into the terminal holders.

* * * * *